United States Patent [19]

Holst et al.

[11] 3,943,768
[45] Mar. 16, 1976

[54] METHOD AND APPARATUS FOR MEASURING PEAK PRESSURE IN FLUIDS

[75] Inventors: Johann Holst, Schwarzenbek; Horst Rüsbüldt, Hamburg, both of Germany

[73] Assignee: H. Maihak AG, Hamburg, Germany

[22] Filed: June 3, 1974

[21] Appl. No.: 476,138

[30] Foreign Application Priority Data
June 6, 1973 Germany............................ 2328741

[52] U.S. Cl.................................... 73/396; 73/392
[51] Int. Cl.²........................................... G01L 7/00
[58] Field of Search ............. 73/396, 392, 419, 420, 73/146.8, 430

[56] References Cited
UNITED STATES PATENTS

| | | |
|---|---|---|
| 1,430,174 | 9/1922 | Marchus ............................... 73/396 |
| 2,049,532 | 8/1936 | Williams ............................... 73/396 |
| 2,518,928 | 8/1950 | Paine et al. ........................... 73/430 |
| 2,848,973 | 8/1958 | Stiens................................... 73/396 |
| 3,498,416 | 3/1970 | Pfister et al........................... 73/430 |
| 3,815,413 | 6/1974 | Marshall et al....................... 73/430 |

*Primary Examiner*—James J. Gill
*Assistant Examiner*—Anthony V. Ciarlante
*Attorney, Agent, or Firm*—Michael S. Striker

[57] ABSTRACT

The pressure of a fluid is applied to an elongated resiliently yieldable element in direction transverse to the elongation thereof, so as to obtain a yielding of the element which is proportional to the fluid pressure. The degree of deflection is measured with an indicator device, and the indicator of the indicator device is arrested at the point at which it indicates maximum deflection. An apparatus for carrying out the method is also disclosed.

8 Claims, 3 Drawing Figures

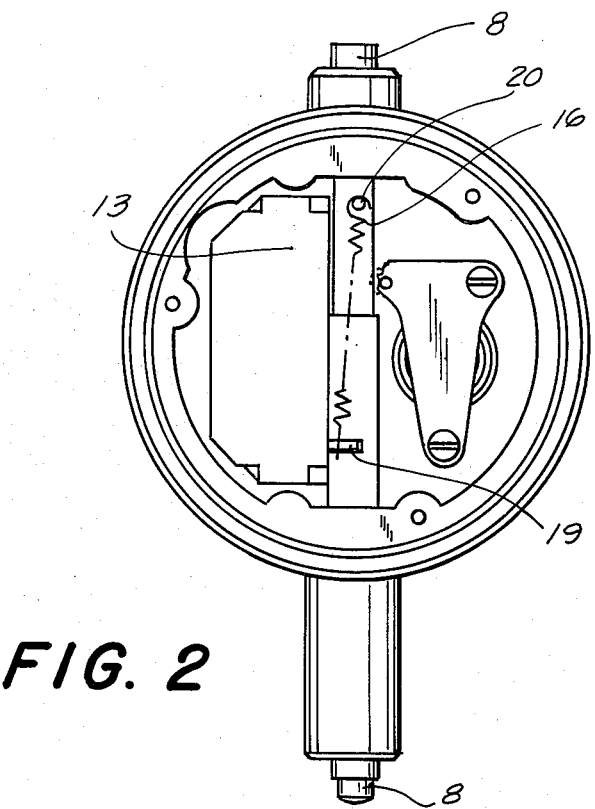
FIG. 2
FIG. 3
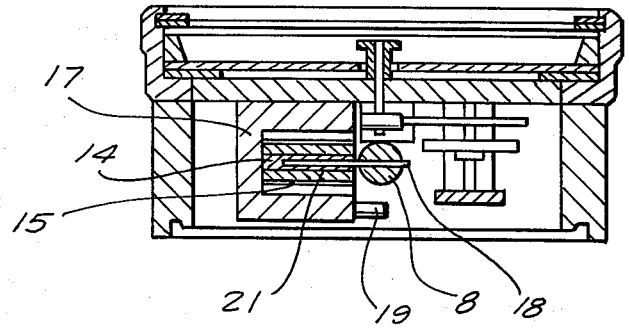

METHOD AND APPARATUS FOR MEASURING PEAK PRESSURE IN FLUIDS

BACKGROUND OF THE INVENTION

The present invention relates generally to the measuring of fluid pressure, and more particularly to a method of measuring the peak pressure in liquids and gases, and to an apparatus for carrying out the method.

There are many applications, for instance in combustion engines, in compressors, in pumps or hydraulic systems, where it is important to know the peak pressure of a liquid or a gas, in order to be able to properly dimension various components in dependence upon this peak pressure, to adjust various components in dependence upon this peak pressure and/or to properly control a particular device in dependence upon this peak pressure.

It is known from the prior art to provide an indicator device which uses a metal stylus to scribe onto a specially prepared paper a graph which indicates pressure conditions and fluctuations in a liquid or gas. However, in order to be able to determine the peak pressure it is necessary to read out the diagram which is prepared by this device, since a direct indication of the peak pressure is not provided.

A further prior-art construction, disclosed in German patent No. 1,112,657, does provide for the indication of peak pressure in a fluid. This device operates with a pressure chamber and a one-way valve and indicates the peak pressure by means of a measuring device which for purposes of indicating the peak pressure may be provided with a so-called drag pointer. The basic concept of providing a direct indication of the peak pressure is advantageous in this prior-construction, but it has been found that in the event of rapid pressure fluctuations the device will not operate accurately due to the finite gas volume in the pressure chamber and the masses of the movable parts, so that it can be employed only for measurements within a certain range if accurate results are required.

SUMMARY OF THE INVENTION

It is, therefore, a general object of the invention to overcome the disadvantages of the prior art.

More particularly, it is an object of the invention to provide a method of measuring peak pressure in fluids which avoids the aforementioned disadvantages.

Still more particularly, it is an object of the invention to provide such a method which permits the measuring of peak pressure in fluids, and which will provide accurate indications even if the pressure of the fluid should fluctuate rapidly.

An additional object of the invention is to provide such a method wherein a deflectable bar spring is employed.

Another object of the invention is to provide an apparatus for carrying out the invention.

In keeping with the above objects, and with others which will become apparent hereafter, one feature of the invention resides in a method of measuring peak pressure in fluids which, briefly stated, comprises the steps of applying the pressure of a fluid to an elongated resiliently yieldable element transversely thereof, so as to obtain yielding of the element in proportion to the fluid pressure, measuring the degree of deflection with an indicator device, and arresting the indicator of the indicator device at the point indicating maximum deflection.

Deflectable resiliently yieldable elements, i.e. bar springs, are already known in measuring devices and are provided with a stylus arrangement which scribes on a paper record carrier as the bar spring is deflected. The present invention employs a different principle, utilizing instead a measuring gauge of the type having a dial and a pointer which moves on the dial and thus indicates the degree of deflection of the bar spring and, hence, the fluid pressure acting upon the bar spring.

The present invention has a further purpose, namely to prevent overshooting of the measuring instrument, that is the gauge, which could be used by rapid pressure fluctuations and the inertia of the movable components.

By arresting the indicator of the indicator device at the point indicating maximum deflection, the peak pressure is measured and indicated, and by having a restoring force acting upon the indicator device, which restoring force is coordinated with the breaking force of the brake used for arresting the indicator, the overshooting of the measuring device is precluded.

The device used for arresting the indicator is a friction brake which advantageously has a guide member provided with a slot in which a carriage can shift, carrying friction pads, the device further being provided with brake members which maintain the carriage in its respective position under the influence of springs, such as leaf springs.

The friction pads advantageously are of a material the coefficient of static friction of which is at least substantially equal to its coefficient of dynamic friction, and polytetrafluoroethylene has been found to be particularly advantageous for this purpose. The carriage itself may be of aluminum.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is an enlarged detail view, with portions removed for better illustration, of the measuring gauge in the embodiment of FIG. 1; and FIG. 3 is a section of an enlarged scale of the friction brake used in the embodiments of FIGS. 1 and 2.

DESCRIPTION OF THE PREFERRED EMBODIMENTS

Figure 1:
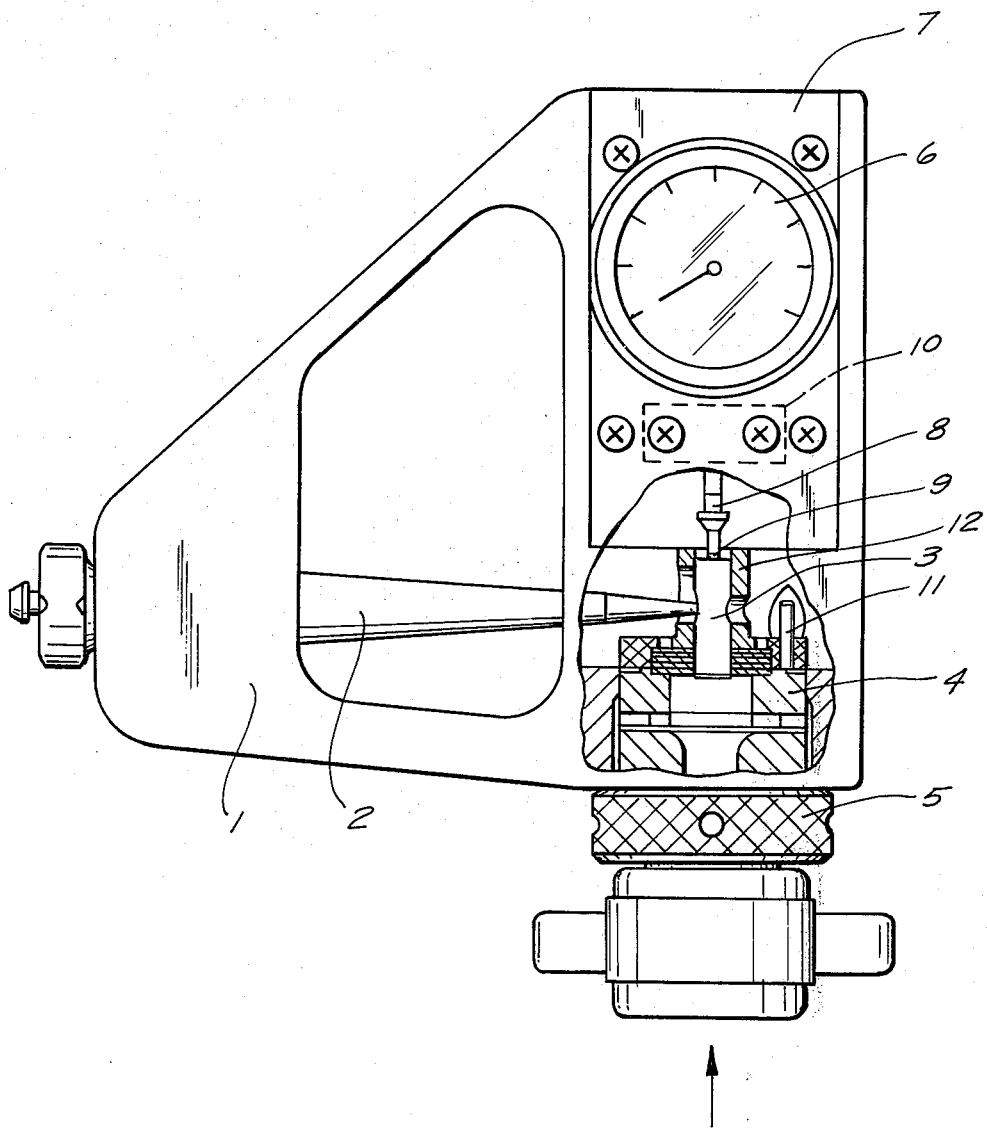
FIG. 1 is a partly broken away side view of an apparatus for carrying out the present invention.

Referring to the drawing in detail, and firstly to FIG. 1, it will be seen that in this embodiment the apparatus is based, as mentioned earlier, upon the principle of deflecting a spring bar. Reference numeral 1 identifies a carrier or support on which an elongated resiliently yieldably deflectable bar spring 2 is mounted, being secured at one end (the left-hand end) in the support 1. A cylinder and piston unit 3, 4 is also mounted in the support 1, having a portion 5 by means of which it can be threadedly secured in a tapped bore provided for this purpose in the support 1. Reference numeral 12 identifies a piston guide wherein the piston 3 of the unit 3, 4 is shiftable and a pin 11 prevents turning of the piston guide.

Thus far, the device of FIG. 1 is known from the prior art. However, in the prior art the deflection of the bar spring 2, which occurs when a fluid (a gas or a liquid) under pressure is allowed to act via the cylinder 4 upon the piston 3 and thus to displace the latter upwardly in FIG. 1 and deflect the spring 2, this movement would act upon a stylus which would scribe a curve upon a paper carrier or the like. In contradistinction thereto, the present invention utilizes a measuring gauge 6 which is mounted on the support 1 and held in place by a holder 10 and a bracket 7. Such measuring gauges are entirely conventional, having a dial as illustrated, upon which a pointer turns, although it is of course possible for the dial to turn with reference to a fixed mark provided on the gauge 6. To obtain the displacement of the pointer or the dial, the gauge 6 is provided with a plunger 8 which can shift upwardly and downwardly in FIG. 1 and the free end of which engages the free end 9 of the piston 3.

Thus, when pressure which varies as a function of time, such as the pressure prevailing in the cylinders of a combustion engine, is admitted into the cylinder 4 to act on the piston 3, the latter is displaced in response to the pressure variations between an initial position and a plurality of displaced positions which correspond to the instantaneous values of the pressure. The free end of the spring 2 is deflected from the position corresponding to the initial position of the piston 3 until the force exerted by the spring 2 on the piston 3 equals the instantaneous force exerted by the fluid on the piston 3, at which time a position of instantaneous equilibrium is achieved. As the pressure varies, the piston 3 and the free end of the spring 2 will move toward the positions of instantaneous equlibrium corresponding to the then prevailing pressure in the cylinder 4. As the piston 3 moves in the upward direction as illustrated in FIG. 1, the plunger 8 is displaced in the same direction, but the plunger 8 does not share the oscillating movement of the piston 3 and of the free end of the spring 2; rather, the plunger 8 is only displaced in one direction, that is upwardly, until it reaches a displaced position corresponding to the peak value of the pressure during a time interval, at which time the brake 13 prevents the return or, for that matter, any other movement of the plunger 8, regardless of the fact that the pressure in the cylinder 4 may have fallen below the peak value.

FIG. 2 shows the construction of the gauge 6 in more detail. It will be seen that reference numeral 13 identifies a friction brake which is described in more detail in FIG. 3, and reference numeral 16 a restoring spring one end of which is connected to a pin 19 that is mounted on a guide 17 of the brake 13, and the other end of which is connected to a screw or similar element 20 that is provided on the plunger 8. The spring 16 therefore tends to restore the plunger to its starting position when the plunger 8 is deflected by the piston 3.

The friction brake 13 is shown in section in FIG. 3 and will be seen to have the guide 17 formed with a slot in which a carriage 14, advantageously but not necessarily made of aluminum, can shift. The carriage 14 is coated or provided with friction pads of a material having a coefficient of static friction which at least substantially equal to its coefficient of dynamic friction, polytetrafluoroethylene being especially suitable for this purpose. A pair of leaf springs 15 is provided, serving the purpose of pressing two brake members 21 against the carriage 14 which latter is connected with the plunger 8 by means of a pin 18.

It will be appreciated that when a source of liquid or gas under pressure, whose peak pressure is to be measured, is connected with the device according to the present invention so as to act via the cylinder 4 upon the piston 3, as indicated by the arrow in FIG. 1, a force is exerted upon the piston 3 which in FIG. 1 acts in upward direction. This displaces the piston and causes bending of the spring 2 until an equilibrium is reached between the resistance of the spring 2 and the force acting upon the piston 3. As the piston 3 moves in the upward direction, it displaces the plunger 8 in the same direction, and during this movement the carriage 14 which is connected via the pin 8 with the plunger 18, is shifted between the two brake members 21 which are pressed against it in the guide 17 by the leaf springs 15. The carriage is thus displaced accordingly.

This friction brake in the gauge 6 has the purpose to compensate the force which results from the mass acceleration of the plunger 8 and the carriage 14, and to permit a direct reading out of the maximum or peak pressure in the fluid after every measuring incident. The deflection of the plunger 8 causes the already partially stressed restoring spring 16 to be further stressed and, in conjunction with the friction in the friction brake 13, this tends to oppose the movement of the plunger 8. The entire braking force acting upon the plunger 8 is supplied approximately to one half by the friction brake 13 and approximately to one half by the restoring spring 16, and this combination of the effects of the friction brake 13 and the restoring spring 16 prevents to a large extent the wearing of the friction material of the brake 13 on the one hand, and then overshooting of the plunger 8 and hence a false indication on the gauge 6, on the other hand.

As already pointed out earlier, it is advantageous if the carriage 14 is of aluminum which is coated or otherwise provided with pads of polytetrafluoroethylene, a material wherein the dynamic coefficient of friction and the static coefficient of friction are substantially equal so that no stick-slip movements can occur, and a smooth continuous displacement of the plunger 8 is guaranteed. This results in exact and readily reproducible measured values.

The resistance that is opposed to the movement of the plunger 8 is furnished, as pointed out above, to the extent of approximately one half by the friction brake 13, and to the extent of approximately the other half by the restoring spring 16. This maximum resistance of one half that is furnished by the restoring spring 16 obtains, of course, when the restoring spring is fully stressed.

It is advantageous if the materials for the components for the friction brake 13 are so selected that the force with which the leaf spring 15 press the brake members 21 against the carriage 14 will remain constant in the event of temperature changes. This temperature compensation guarantees minimum wearing away of the friction surfaces. It can be obtained in an advantageous manner by using the aforementioned polytetrafluoroethylene layers as friction pads on the carriage 14 made of aluminum, and by making the brake members 21 of steel. However, other combinations of materials are possible also and should be understood to be encompassed herein.

The present invention provides for a method which overcomes the disadvantages of the prior art, and provides a measuring apparatus or device which is simple in its construction and highly reliable in its operation. The apparatus provides for a direct indication of the peak pressure that is measured, and can be used at operational ranges wherein the prior art devices were not suitable, for instance at frequencies up to 2000 rotations per minute.

It will be understood that each of the elements described above, or two or more together, may also find a useful application in other types of constructions differing from the type described above.

While the invention has been illustrated and described as embodied in the measuring of peak pressure values in fluids, it is not intended to be limited to the details shown since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Apparatus for determining the highest peak value of fluctuating fluid pressure which varies over time, comprising a housing; indicating means including a plunger mounted in said housing for movement between a starting position and a plurality of indicating positions corresponding to different peak values of the pressure; means for detecting the instantaneous value of the pressure of the fluid and including an actuating element mounted in said housing for displacement in a path between an initial position and a plurality of displaced positions, and an elongated resiliently yieldable element extending transversely to said path and having one end portion fixedly mounted in said housing at a location laterally spaced from said path and a free end portion extending into said path and connected to said actuating element to urge the same toward said initial position so that said actuating element is displaced toward a displaced position as the pressure varies toward the peak value thereof and is displaced toward the initial position as the pressure varies away from the peak value thereof by the action of said yieldable element, said actuating element being operatively connected to said plunger to move the same from said starting position into a respective indicating position and from an indicating position corresponding to a lower peak value into an indicating position corresponding to a higher peak value of the pressure, said actuating element being disconnected from said plunger when the former is displaced towards said initial position thereof; and friction brake means acting on said plunger so as to retain the same in its indicating position during the displacement of said actuating element towards said initial position thereof and to prevent said plunger from moving beyond the respective indicating position corresponding to the highest peak value of the pressure.

2. Apparatus as defined in claim 1, said friction brake means including a guide member; and further comprising a restoring spring having one end secured to said plunger and another end secured to said guide member.

3. Apparatus as defined in claim 2, wherein the restoring force of said spring in the fully stressed condition thereof is substantially in a condition of equilibrium with the braking force exerted by said friction brake means.

4. Apparatus as defined in claim 5, said guide member having a slot, and said friction brake means further including a brake carriage slidable in said slot, friction pads on said carriage, brake members and spring acting upon said brake members so that the latter frictionally engage said carriage.

5. Apparatus as defined in claim 4, wherein said friction pads are of a material having a coefficient of static friction which substantially equals its coefficient of dynamic friction.

6. Apparatus as defined in claim 5, wherein said material is polytetrafluoroethylene.

7. Apparatus as defined in claim 5, wherein said carriage is of aluminum; and said material of said friction pads is polytetrafluoroethylene.

8. Apparatus as defined in claim 1, wherein said friction brake means is composed of materials which are selected to provide temperature compensation of the friction braking force.

* * * * *